(12) United States Patent
Gold

(10) Patent No.: US 9,086,991 B2
(45) Date of Patent: Jul. 21, 2015

(54) SOLID STATE DRIVE CACHE RECOVERY IN A CLUSTERED STORAGE SYSTEM

(71) Applicant: Israel Gold, Haifa (IL)

(72) Inventor: Israel Gold, Haifa (IL)

(73) Assignee: INFINIDAT LTD., Herzliya (IL)

( * ) Notice: Subject to any disclaimer, the term of this patent is extended or adjusted under 35 U.S.C. 154(b) by 220 days.

(21) Appl. No.: 13/769,858

(22) Filed: Feb. 19, 2013

(65) Prior Publication Data

US 2014/0237321 A1  Aug. 21, 2014

(51) Int. Cl.
  *G11C 29/00* (2006.01)
  *G06F 11/10* (2006.01)

(52) U.S. Cl.
  CPC .................. *G06F 11/1068* (2013.01)

(58) Field of Classification Search
  USPC ........................................................ 773/773
  See application file for complete search history.

(56) References Cited

U.S. PATENT DOCUMENTS

| | | | |
|---|---|---|---|
| 2007/0201434 A1* | 8/2007 | Nakamura et al. | 370/352 |
| 2009/0006888 A1* | 1/2009 | Bernhard et al. | 714/6 |
| 2012/0131126 A1* | 5/2012 | Bandyopadhyay et al. | 709/213 |
| 2012/0221774 A1* | 8/2012 | Atkisson et al. | 711/103 |
| 2013/0166831 A1* | 6/2013 | Atkisson et al. | 711/103 |
| 2013/0339576 A1* | 12/2013 | Liu et al. | 711/103 |
| 2014/0173326 A1* | 6/2014 | Belluomini et al. | 714/2 |

OTHER PUBLICATIONS

Authors: Richard Golding and Elizabeth Borowsky; Title: Fault-tolerant replication management in large-scale distributed storage systems; Published: Reliable Distributed Systems, 1999. Proceedings of the 18th IEEE Symposium on 1999, pp. 144-155.*

* cited by examiner

*Primary Examiner* — April Y Blair
*Assistant Examiner* — Thien D Nguyen
(74) *Attorney, Agent, or Firm* — Reches Patents (57) ABSTRACT

A storage system that includes multiple nodes, each node comprises a SSD cache and a management module and hard disk drives that are coupled to the nodes. The management module of each node is arranged to manage a SSD cache map that comprises multiple entries for storing mappings from logical addresses to SSD cache physical addresses and to physical addresses in the hard disk drives. The mappings are related to data units stored in the SSD cache. Upon a rejoin of a certain node following a shut-down or a failure of the certain node, the certain node is arranged to: obtain from at least one other node, current mappings between logical addresses and physical addresses in the hard disk drives, and perform a validation process of the data units stored in the SSD cache in response to relationships between the current mappings and the entries of the SSD cache map.

20 Claims, 4 Drawing Sheets

SOLID STATE DRIVE CACHE RECOVERY IN A CLUSTERED STORAGE SYSTEM

BACKGROUND

In recent years flash memory devices such as solid state drives (SSDs) has seen growing success in the primary storage markets. SSD is a flash memory packaged in hard-drive form.

An SSD, also called as solid-state disk, is a data storage device that uses flash memory to store data persistently. SSD technology provides an interface that is compatible with traditional block I/O hard disk drives. However, it does not employ any moving mechanical components, which distinguishes it from traditional magnetic disk technology, such as hard disk drives (HDD) (see:www.wikipedia.org).

SSDs are more costly than HDDs per storage unit but are typically less susceptible to physical shock, are silent, and have lower access time and latency. Due to these reasons SSDs have become much more main stream in the last few years. File servers and storage arrays manufacturers use Flash and SSD devices as performance booster.

For example, EMC® offers FASTCache™ that is a large-capacity secondary tier of Flash-memory-based caching between storage system's fast limited capacity dynamic random access memory (DRAM) cache, and slower high capacity hard disk drives.

Similarly, NetApp® offers flash cards with intelligent caching mechanism named Performance Acceleration Module™ (PAM), to boost read intensive workloads.

The advanced ZFS™ file system may be configured to use SSD for the level 2 Adaptive Replacement Cache™ (L2ARC), as read only cache.

Distributed storage systems may include multiple nodes that include SSD caches. Once a node fails the entire content of the SSD cache is invalidated and its recovery is time and effort consuming.

There is a need to provide efficient methods systems and computer readable media that allow reconstruction of SSD cache after failure.

SUMMARY

According to an embodiment of the invention various methods may be provided and are described in the specification. According to various embodiments of the invention there may be provided a non-transitory computer readable medium that may store instructions for performing any of the methods described in the specification and any steps thereof, including any combinations of same. Additional embodiments of the invention include a storage system arranged to execute any or all of the methods described in the specification above, including any stages—and any combinations of same.

According to an embodiment of the invention there may be provided a storage system that may include multiple nodes, each node comprises a solid state drive (SSD) cache and a management module; hard disk drives that are coupled to the nodes;

wherein each management module is arranged to manage a SSD cache map that comprises multiple entries for storing mappings between logical addresses to SSD cache physical addresses and to physical addresses in the hard disk drives; wherein the mappings are related to data units stored in the SSD cache; wherein upon a rejoin of a certain node following a shut-down or a failure of the certain node, the certain node is arranged to: obtain from at least one other node, current mappings between logical addresses and physical addresses, and perform a validation process of the data units stored in the SSD cache in response to relationships between the current mappings and the entries of the SSD cache map.

The certain node may be arranged to invalidate an entry of the SSD cache map that stores a certain logical address if a mapping of that certain logical address to a physical address as reflected by the entry of the SSD cache map differs from a mapping of the certain logical address as reflected by the current mappings.

The certain node may be arranged to reject SSD cache read requests until the validation process is completed.

The certain node may be arranged to maintain a hard disk drives (HDDs) map that maps logical addresses to physical addresses; wherein upon the rejoin, the certain node may be arranged to update the HDDs map to reflect the current mapping between logical addresses and physical addresses.

Each node may be arranged to store in the SSD cache only data units that were already stored in a hard disk drive.

The certain node may be arranged to invalidate an entry of the SSD cache map that refers to a certain physical address and to a certain logical address if it is suspected that while the certain node was in a failed state, another node wrote to the certain physical address a data unit that was referred by the certain logical address.

The certain node may be arranged to invalidate an entry of the SSD cache map that refers to a certain physical address and to a certain logical address if it is suspected that while the certain node was in a failed state, another node wrote to the certain logical address a data unit regardless of a physical address allocated to the certain logical address.

The SSD cache map entries store timestamps indicative of a time of writing data units to the SSD cache.

The certain node may be arranged to invalidate, during the validation process and in response to the timestamps, SSD cache map entries that store data units that were written to the SSD cache more than a predetermined period before the validation process.

The length of the predetermined period may be determined in accordance to an expected duration between two successful write operations to a same physical address.

The storage system wherein a length of the predetermined period may be determined in accordance to an expected duration between two successful write operations of data units of a same logical address to a same physical address.

The certain node may be arranged to invalidate an entry of the SSD cache map that refers to a certain physical address and to a certain logical address if detecting an invalidation event that occurred while the certain node was in a failed state, and the invalidation event included writing by another node to the certain physical address a data unit that was referred by the certain logical address.

The certain node may be arranged to invalidate an entry of the SSD cache map that refers to a certain physical address and to a certain logical address if detecting an invalidation event that occurred while the certain node was in a failed state, and the invalidation event included writing a data unit by another node to the certain physical address.

The certain node may be arranged to detect the invalidation event by processing physical address re-allocation metadata indicative of physical address re-allocation events.

The SSD cache map further stores physical address re-allocation metadata and wherein the certain node may be arranged to detect the invalidation event by comparing between physical address re-allocation metadata value and current value of physical address re-allocation metadata.

According to an embodiment of the invention there may be provided a method that may include: maintaining, by each node out of multiple nodes of a storage system, a solid state disk (SSD) cache map that may include multiple entries for storing mappings between logical addresses to SSD cache physical addresses and to hard disk drives (HDDs) physical addresses; wherein the multiple nodes are coupled to hard disk drives and each node may include a solid state drive (SSD) cache and a management module; and performing a recovery process of a certain node, upon a rejoin of the certain node following a shut-down or a failure of the certain node, wherein the recovery process may include obtaining from at least one other node, current mappings between logical addresses and Physical addresses, and performing a validation process of the entries of the SSD cache is response to relationships between the current mappings and the entries of the SSD cache map.

The method may include invalidating an entry of the SSD cache map that stores a certain logical address if a mapping of that certain logical address to a physical address as reflected by the entry of the SSD cache map differs from a mapping of the certain logical address as reflected by the current mappings.

The method may include rejecting SSD cache read requests until the validation process is completed.

The method may include maintaining a hard disk drives (HDDs) map that maps logical addresses to physical addresses; and updating, after a failure of the certain node, the HDDs map to reflect the current mapping between logical addresses and physical addresses.

The method may include storing, by each node, in the SSD cache only data units that were already stored in a hard disk drive.

The method may include invalidating an entry of the SSD cache map that refers to a certain physical address and to a certain logical address if it is suspected that while the certain node was in a failed state, another node wrote to the certain physical address a data unit that was referred by the certain logical address.

The method may include invalidating an entry of the SSD cache map that refers to a certain physical address and to a certain logical address if it is suspected that while the certain node was in a failed state, another node wrote to the certain physical address a data unit regardless of a logic address allocated to the certain physical address.

The method may include storing in the SSD cache map timestamps indicative of a time of writing data units to the SSD cache.

The method may include invalidating, during the validation process and in response to the timestamps, SSD cache map entries that store data units that were written to the SSD cache more than a predetermined period before the validation process.

The method wherein a length of the predetermined period may be determined in accordance to an expected duration between two successful write operations to a same physical address.

The length of the predetermined period may be determined in accordance to an expected duration between two successful write operations of data units of a same logical address to a same physical address.

The method may include invalidating an entry of the SSD cache map that refers to a certain physical address and to a certain logical address if it detected an invalidation event that occurred while the certain node was in a failed state, and the invalidation event included writing by another node to the certain physical address a data unit that was referred by the certain logical address.

The method may include invalidating an entry of the SSD cache map that refers to a certain physical address and to a certain logical address if it detected an invalidation event that occurred while the certain node was in a failed state, and the invalidation event included writing by another node to the certain physical address a data unit.

The method may include detecting the invalidation event by processing physical address re-allocation metadata indicative of physical address re-allocation events.

The method may include storing in the SSD cache map physical address re-allocation metadata and wherein the method may include detecting the invalidation event by comparing between physical address re-allocation metadata value and current value of physical address re-allocation metadata.

According to an embodiment of the invention there may be provided a non-transitory computer readable medium that stores instructions for: maintaining, by each node out of multiple nodes of a storage system, a solid state disk (SSD) cache map that may include multiple entries for storing mappings between logical addresses to SSD cache physical addresses and to physical addresses; wherein the multiple nodes are coupled to hard disk drives and each node may include a SSD cache and a management module; and performing a recovery process of a certain node upon a rejoin of a certain node following shut-down or a failure of the certain node, wherein the recovery process may include (a) obtaining from at least one other node, current mappings between logical addresses and physical addresses, and (b) performing a validation process of the entries of the SSD cache is response to relationships between the current mappings and the entries of the SSD cache map.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The term "map" refers to any type of data structure that includes information that may assist in mapping between different entities.

The term data unit refers to any entity of information.

The terms "managing" and "maintaining" are used in an interchangeable manner.

The following text may refer to node failures but it is applicable mutatis mutandis to a shut-down of the node. The failed or shut down node may recover from the failure and rejoin the cluster of nodes.

The term "rejoin" refers to a node failure recover process or a node shut-down recovery process. During the rejoin the node joins a cluster of nodes that can withstand a failure or one or more nodes. The phrase "upon a rejoin' indicates an action that is executed during the rejoin or in timing proximity to the rejoin.

Figure 1:
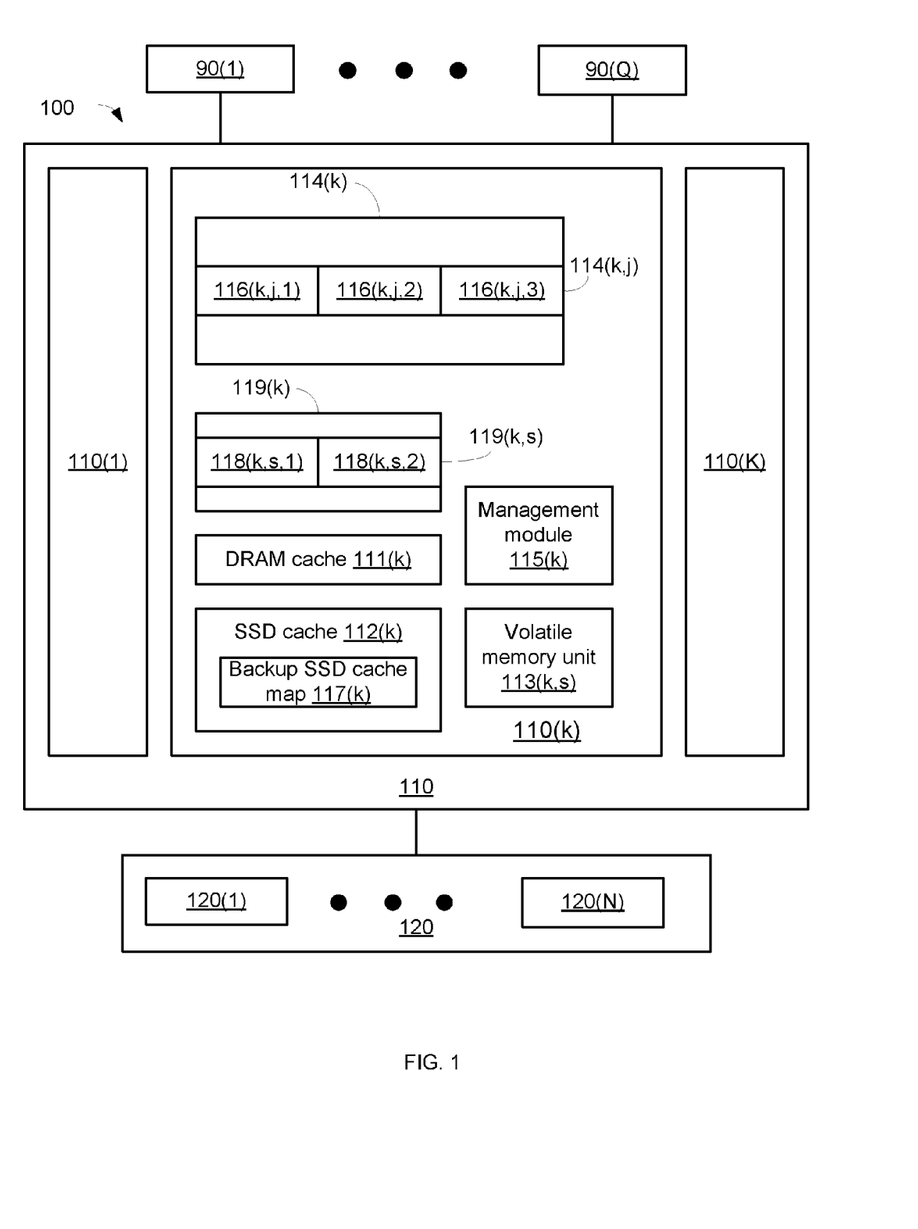
FIG. 1 illustrates storage system and its environment according to an embodiment of the invention.

FIG. 1 illustrates a storage system 100 and its environment according to an embodiment of the invention.

Storage system 100 can be accessed by multiple computerized systems 90(1)-90(Q). Each one of the computerized systems 90(1)-90(Q) can read data from the storage system 100 or write data to the storage system 100. Storage system 100 handles the cached and stored data in portions, referred herein as 'data units'. Each data unit is associated with a logical address of a logical address space. The logical address space may be much larger that the physical address space supported by the storage system 100.

The storage system 100 includes a cache and management layer 110 and a hard disk drives (HDDs) layer 120. The HDDs layer 120 includes multiple hard disk drives 120(1)-120(N). The HDDs layer 120 supports a physical address space.

The cache and management layer 110 includes multiple clustered computerized nodes 110(1)-110(K) (e.g. data servers) and is arranged to handle read and write requests received from computerized systems 90(1)-90(Q) and directed to data stored in hard disk drives (HDDs) layer 120. The read and write requests received from computerized systems 90(1)-90(Q) are indicative of logical addresses to be read from/written to, for example, the read and write requests may include a logical volume identifier and a logical block address (LBA) that indicates a block offset within the logical volume. The cache and management layer 110 is further arranged to map the logical addresses of the logical address space to physical addresses of the physical address space. When a data unit is de-staged (sent from the cache and management layer 110 to be stored in the HDDs layer 120) the node 110 that de-stages that data unit maps the logical address of the data unit to a physical address.

The cache and management layer 110 is further configured to utilize physical space allocation known as 'write anywhere' (also known as 'log write' or 'write out-of-place'), so that when a write-request that is related to modification of existing data (overwriting the existing data with new data) in a certain logical address, the 'write anywhere' technique enables writing the new data, associated with the certain logical address, to any available physical address range. When using 'write anywhere' technique the mapping of a logical address into a physical address is changed upon each write operation directed to the logical address, i.e. a different physical address is associated with the logical address upon each write.

Each node (110(k), wherein k ranges between 1 and K) can access the entire physical address space or a portion of the entire address space. Each node can utilize the entire logical address space or a portion thereof.

According to an embodiment of the invention each node 110(k) can access the entire physical address space. The responsibility for handling the logical address space may be shared among nodes 110(1)-110(K), such that each node 110(k) handles read and write requests directed to the portion of the logical address space that is defined to be under the responsibility of this node 110(k). This portion can include one or more virtual partitions of the logical address space.

Each node 110(k) includes a volatile RAM (Read Only Memory) cache 111(k) (that utilizes e.g., a dynamic random access memory (DRAM) or static random access memory (SRAM)), a solid state drive (SSD) cache 112(k) and a management module 115(k).

The RAM cache 111(k) can be used to service read requests from the RAM cache 111(k) rather than wait for the HDDs layer 120 and to service write requests by temporarily storing data in the cache before permanently storing the data in disk drives of HDDs layer 120. To improve the performance of read workloads the node 110(k) includes the SSD cache 112(k) that is used as a secondary level read-only cache that may hold non-dirty data units (data units that were destaged to the HDDs layer 120 or read from the HDDs layer 120 without being modified).

Each node 110(k) is arranged to manage a SSD cache map 114(k). The SDD cache map 114(k) is constantly updated and may be stored in a volatile memory unit 113(k) of the node 110(k).

The SSD cache 112(k) may support read, write and delete operations directed to the SSD cache 112(k). A read operation may trigger a SSD cache map lookup of the logical address indicated in the read request. If the lookup fails it means that the specified data unit associated with the logical address is not stored in the SSD cache 112(k) and it is read from the HDDs layer 120. If the lookup is successful, the requested data unit is read from the SSD cache 112(k). A delete operation marks an entry of SSD cache map 114(k) as invalid so that lookup will fail.

Storage system 100 is also arranged to store a backup SSD cache map 117(k), which is a copy of SSD cache map 114(k) in a non-volatile memory such as SSD cache 112(k) or in one of the HDDs 120(n) or in an internal disk drive (not shown) included in node(k) and used for management purposes. For brevity of explanation FIG. 1 illustrates the backup SSD cache map 117(k) as being stored in the SSD cache 112(k).

Storage system 100 is arranged to update the backup SSD cache map 117(k) with the content of the SSD cache map 114(k) by applying a backup process. For example, the backup SSD cache map 117(k) may be updated with the current content of the SSD cache map 114(k) when a node is being shut down or at other points of time.

The management module 115(k) is arranged to control the storing of data units in the RAM cache 111(k), the de-staging of the data units to the HDDs layer 120 and the storing of the data units to the SSD cache 112(k).

According to an embodiment of the invention the management module 115(k) writes to the SSD cache 112(k) only data units that have been de-staged—but this is not necessarily so.

The SSD cache map 114(k) includes multiple entries 114(k,j), an entry for each of the multiple data units currently stored in SSD cache 112(k), for storing mappings between logical addresses of the stored data units to SSD cache physical addresses and physical addresses of the HDDs layer 120. FIG. 1 illustrates SSD cache map 114(k) as including multiple entries 114(k,1)-114(k,J), wherein each entry 114(k,j) includes a logical address field 116(k,j,1), a SSD cache physical address field 116(k,j,2) and a physical address field 116(k,j,3).

The logical address field 116(k,j,1) is indicative of the logical address of a data unit. The SSD cache physical address field 116(k,j,2) is indicative of the physical address of the data unit in the SSD cache 112(k). The Physical address field 116(k,j,3) is indicative of the physical address of the data unit at the HDDs layer 120.

Each node 110(k) also stores a hard disk drives (HDDs) map 119(k) that maps logical addresses to physical addresses (of the HDDs layer). Typically HDDs map 119(k) is a volatile memory resident and is periodically backed up to a non-volatile memory.

The nodes 110(1)-110(K) can communicate with each other so that each node 110(k) will have mapping information between the entire logical address space and the entire Physical space, or alternatively, for backing up the content of HDDs map 119(k), such that mapping of any logical address is stored in at least two nodes.

FIG. 1 illustrates HDDs map 119(k) as including multiple entries 119(k,1)-119(k,S), wherein each entry 119(k,$) is illustrated as including a logical address field 118(k,s,1) and a physical address field 118(k,s,2).

Failure/Shut-Down Recovery

The storage system 100 may be arranged to withstand a failure or a graceful shut-down of one or more nodes so that during a failure (or shut down) period of a node other nodes can service access requests issued by the computerized systems 90(1)-90(Q) and directed to the portion of the logical address space that was under the responsibility of the failed node.

For simplicity of explanation it is assumed that a certain node failed and this certain node will be referred to as node 110(k) or as the failed node.

During the failure period of certain node 110(k) the other nodes can continue in reading and writing data units that belong to the logical address space under the responsibility of the failed node 110(k) from and to the HDDs layer 120 and thus changing the mapping between logical addresses and physical addresses.

It noted that the other nodes can even re-distribute the responsibilities for the logical address space, for example, the other nodes can take over the responsibility for the portion(s) of the logical address space previously controlled by the certain node that failed. After the certain node recovered from its failure, the nodes can re-distribute (again) the responsibilities for the logical address space, for example, the recovered node can retake over the responsibility for the portions of the logical address space that were under its responsibility before its failure and that were used by other nodes during the failure period.

When the failed certain node 110(k) restarts and rejoins the cluster, the certain node 110(k) undergoes a recovery process. The recovery process may be initiated by the certain node 110(k), by another node or by other components of the storage system 100.

The recovery process may include an update of the HDDs map 119(k) and of the SSD cache map 114(k).

The HDDs map 119(k) can be updated to include the current mapping between logical addresses and physical addresses. The certain node 110(k) can receive the current mapping information from other nodes.

It is assumed that the failure of the certain node 110(k) erases the SSD cache map 114(k)—as it was stored at volatile memory 113(k). In most cases the backup SSD cache map 117(k) is not updated—due to gaps between the backup SSD cache map 117(k) and the SSD cache map 114(k) before the failure (unless node(k) was gracefully shut down) and because of write operations directed to logical addresses included in backup SSD cache map 117(k) and executed during the failure period by the other nodes. The write operations executed during the failure period may also cause the HDDs map 119(k) to include inaccurate mapping between physical and logical addresses.

The recovery of the SSD cache map 114(k) may include retrieving the backup SSD cache map 117(k), copying the content of the backup SSD cache map 117(k) to the SSD cache map 114(k) and checking the validity of the entries of the SSD cache map 114(k).

The validity of each entry 114(k,j) of the SSD cache map 114(k) can be checked by comparing between (a) the mapping between the logical address (field 116(k,j,1)) and a physical address (field 116(k,j,3)) of entry 114(k,j) and (b) the mapping between the same logical address and a physical address as reflected in the HDDs map 119(k). When a 'write anywhere' scheme is used, a new physical address is allocated on each write access related to a logical address and thus each write access changes the physical address mapped to the logical address. The change of the physical address related to a logical address can indicate a modification that was made to data in the logical address, during the failure period.

Figure 2:
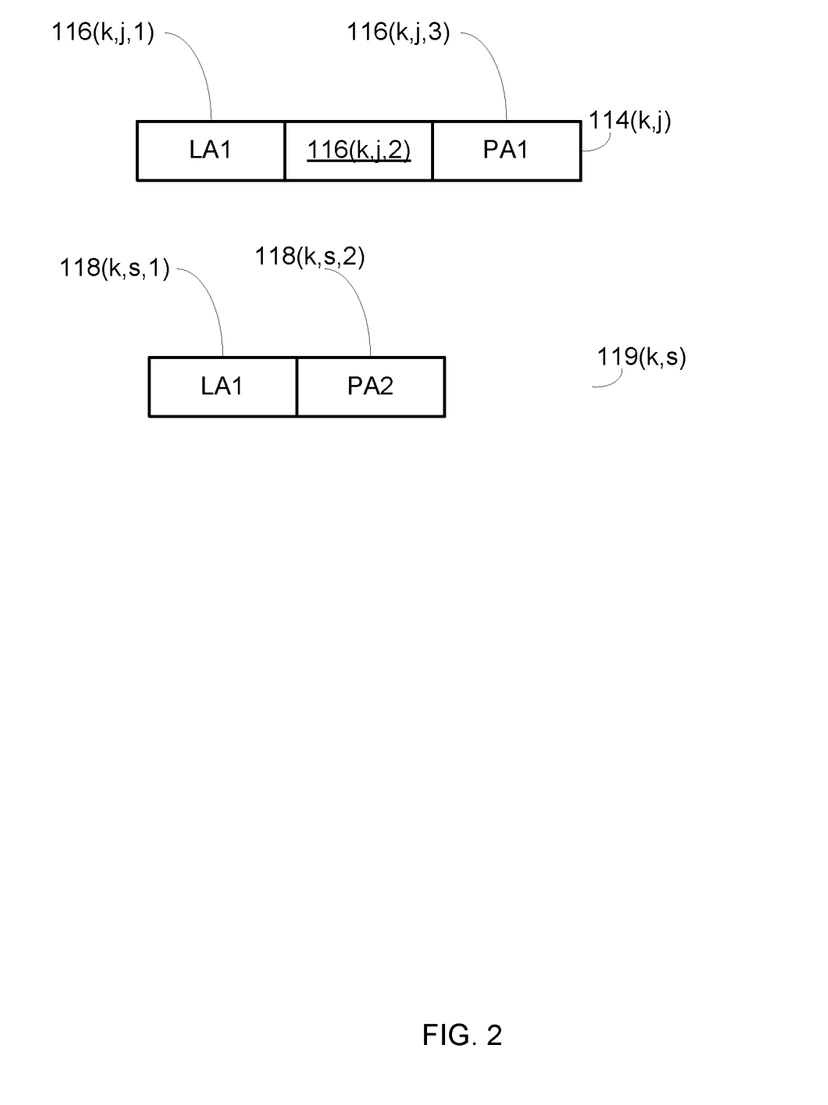
FIG. 2 illustrates various data structures according to an embodiment of the invention.

FIG. 2 illustrates a comparison according to an embodiment of the invention. It is assumed that the logical address stored in fields 116(k,j,1) and 118(k,s,1) have the same value (denoted LA1). The validation process includes comparing the value (PA1) of the physical address field 116($k,j$,3) of SSD cache map 114($k$) to the value (PA2) of the physical address field 118($k,s$,2) of HDDs map 119. The latter is expected to store (after being updated) the current mapping between logical addresses and physical addresses.

If the value of field 116($k,j$,3) equals the value of field 118($k,s$,2) (PA1=PA2) then entry 114($k,j$) is valid. If the value of field 116($k,j$,3) differs from the value of field 118($k,s$,2) (PA1<>PA2) then entry 114($k,j$) is invalidated.

If the same logical address is mapped to the same physical addresses in both the SSD cache map 114($k$) and the HDDs map 119($k$) then entry 114($k,j$) is valid. Else—entry 114($k,j$) can be invalidated.

According to an embodiment of the invention the SSD cache 112($k$) does not receive (it rejects) read attempts and, additionally or alternatively write attempts until the validation process ends.

Detecting Invalidation Events

The storage system 100 may dynamically map logical addresses to physical addresses. The mapping changes overtime so that once a physical address is freed, it can be re-written and associated with a new logical address. Although the physical address space and the logical address spaces are very large there is a small possibility that an invalidation event will occur and the same physical address will be assigned to a certain logical address at different points of time—during different address re-assignment and de-stage cycles.

Accordingly—the data content addressed by the logical address has changed but the mapping between the logical address and the physical address remains unchanged—and does not reflect the change of content.

If, for example, during a failure period of certain node 110($k$) the data content addressed by a certain logical address changed but the mapping between the Physical address and the logical address remained the same (and does not reflect the change of content) the comparison mentioned above between the SDD cache map 114($k$) and the HDD map 119($k$) will not detect such a change and the SDD cache 112($k$) may store an irrelevant data unit without being aware to that problem.

This problem can be addressed by at least one of the following solutions. These solutions use various types of physical address re-allocation metadata (metadata that may be indicative of a possible or actual occurrence of an invalidation event). It is noted that the solution can include checking if during the failure period an entry addressed by a physical address was re-written and was re-assigned with the same logical address as the old logical address that existed when the failure started. This approach can be resource consuming. Alternatively the re-writing to a physical address can trigger the invalidation of that physical address. This approach may be less accurate but is much more easy to implement.

A. Associating a version indicator to each physical address, the version indicator can be indicative of a number of times the entry addresses by the physical address is re-written. The HDDs map 119($k$) and the SDD cache map 114($k$) should include version indicators. Differences in version indicators associated with the same Physical address may result in an invalidation of the SSD map entry.

B. Associating a timestamp to each physical address, the timestamp can be indicative of a last time the entry addressed by the physical address was written. The HDDs map 119($k$) and the SDD cache map 114($k$) should include timestamps. Differences in timestamps associated with the same physical address may result in an invalidation of the SSD map entry. In order to reduce the length of the timestamp the resolution of the timestamp can be reduced to provide a tradeoff between size of timestamp and its accuracy.

C. Associating a SSD cache timestamp. The SSD cache timestamp can provide an indication about the time of writing to entries of the SSD cache. An example of an SSD timestamp can indicate the time of writing of the oldest valid entry of the SSD cache. If the difference between the SSD cache timestamp and the time in which the recovery process occurs exceeds a predetermined period the entire SSD cache can be regarded as invalid. The length of the predetermined period may be determined in accordance to an expected duration between two successful write operations to a same physical address or in response to an expected duration between two successful write operations of data units of a same logical address to a same physical address.

Figure 3:
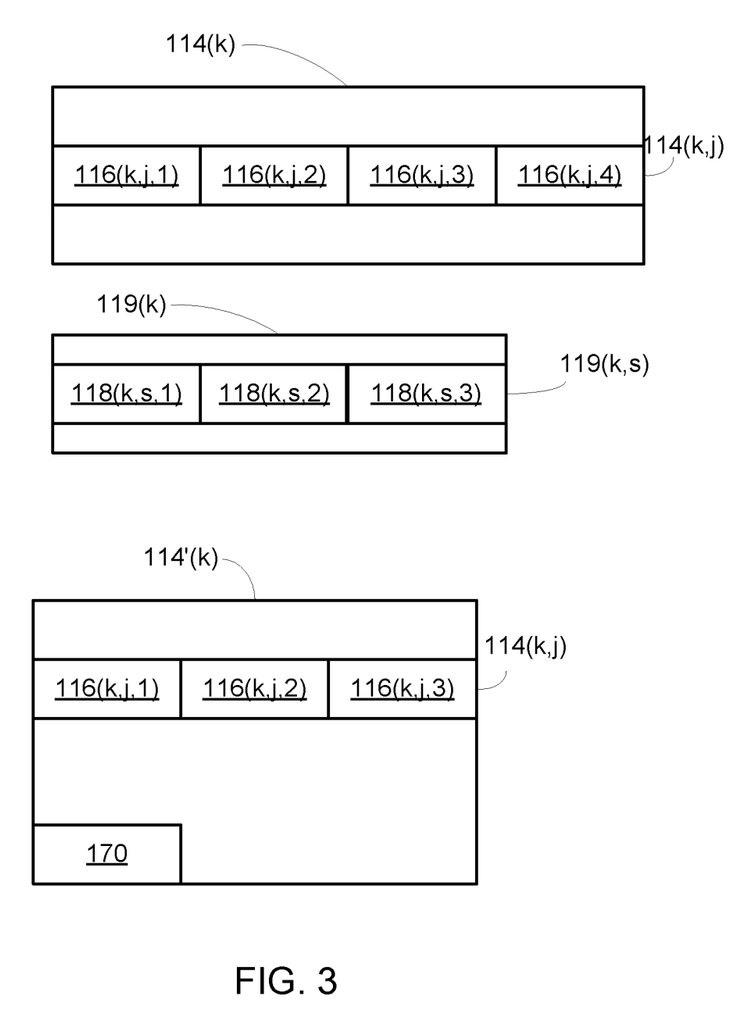
FIG. 3 illustrates various data structures according to an embodiment of the invention.

FIG. 3 illustrates the SSD cache map 114($k$) as including multiple entries 114($k,j$), wherein each entry 114($k,j$) includes a logical address field 116($k,j$,1), a SSD cache physical address field 116($k,j$,2), a physical address field 116($k,j$,3) and a version indicator field 116($k,j$,4).

FIG. 3 illustrates the HDDs map 119($k$) as including multiple entries 119($k$,$), wherein each entry 119($k$,$) includes a logical address field 118($k,s$,1), a physical address field 118($k,s$,2) and a version indicator 118($k,s$,3).

FIG. 3 also illustrated another SSD cache map 114'($k$) with a single SSD time stamp 170.

Figure 4:
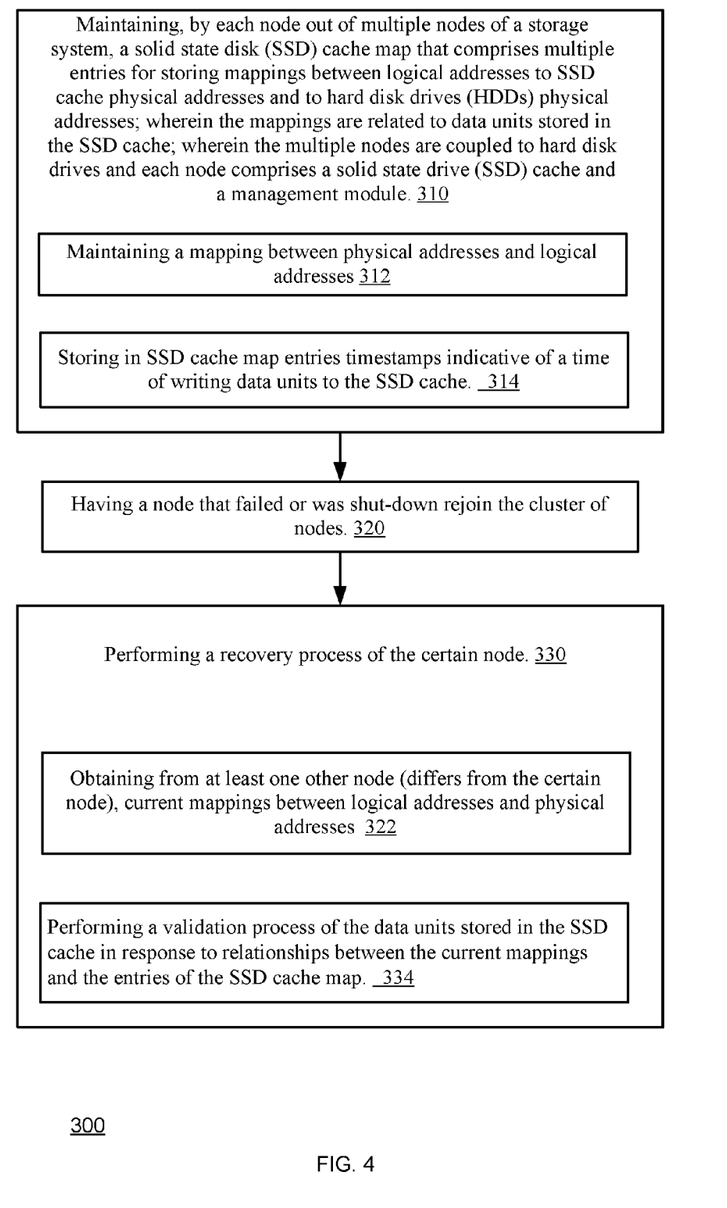
FIG. 4 illustrates a method according to an embodiment of the invention.

FIG. 4 illustrates method 300 according to an embodiment of the invention.

Method 300 may start by stage 310 of maintaining, by each node out of multiple nodes of a storage system, a SSD cache map that may include multiple entries for storing mappings between logical addresses to SSD cache physical addresses and to physical addresses (of a HDDs layer). The multiple nodes are coupled to hard disk drives of the HDDs layer and each node may include a solid state drive (SSD) cache and a management module.

The SSD cache may be used for storing only data units that are already stored in a hard disk drive. The SSD cache may be used for storing only non-dirty data units.

Stage 310 may include at least one of the following:

A. Stage 312 of maintaining a mapping between physical addresses and logical addresses.

B. Stage 314 of storing in SSD cache map entries timestamps indicative of a time of writing data units to the SSD cache.

Stage 312 may include maintaining a HDDs map that maps logical addresses to physical addresses in the HDDs layer.

Stage 310 may be followed by stage 320 of having a node that failed or was shut-down rejoin the cluster of nodes.

Stage 320 may be followed by stage 330 of performing a node recovery process of the certain node.

Stage 330 may include stage 332 of obtaining from at least one other node (differs from the certain node), current mappings between logical addresses and physical addresses. Stage 332 may include updating, after the failure of the certain node, the HDDs map to reflect the current mapping between logical addresses and physical addresses.

Stage 330 may also include stage 334 of performing a validation process of the data units stored in the SSD cache in response to relationships between the current mappings and the entries of the SSD cache map.

Stage 334 may include at least one of the following:

A. Invalidating an entry of the SSD cache map that stores a certain logical address if a mapping of that certain logical address to a physical address as reflected by the entry of the SSD cache map differs from the mapping of the certain logical address to a physical address as reflected by the current mappings, e.g., the physical address associated with the certain logical address, in the SSD cache map, differs from the physical address associated with the certain logical address, in the current mapping. Invalidating an entry may include deleting the entry from the SSD cache map or just setting an invalidation flag associated with the entry and indicates that the entry is invalid. A subsequent lookup of a logical address that was included in the invalidated entry will result a lookup failure and the data unit corresponding to the logical address will be read from the physical address space, rather than from the SSD cache.

B. Rejecting SSD cache read requests until the validation process is completed.

C. Invalidating an entry of the SSD cache map that refers to a certain physical address and to a certain logical address if it is suspected that while the certain node was in a failed state, another node wrote to the certain logical address a data unit (either of the certain physical address or any other physical address).

D. Invalidating, during the validation process and in response to the timestamps, SSD cache map entries that store data units that were written to the SSD cache more than a predetermined period before the validation process. The length of the predetermined period may be determined in accordance to an expected duration between two successful write operations to a same Physical address. The length of the predetermined period may be determined in accordance to an expected duration between two successful write operations of data units of a same logical address to a same Physical address.

E. Invalidating an entry of the SSD cache map that refers to a certain physical address and to a certain logical address if it detected an invalidation event that occurred while the certain node was in a failed state, and the invalidation event included writing by another node to the certain physical address a data unit that was referred by the certain logical address (or of another logical address).

F. Detecting the invalidation event by processing physical address re-allocation metadata indicative of HDDs address re-allocation events.

G. Detecting the invalidation event by comparing between Physical address re-allocation metadata value and current value of Physical address re-allocation metadata.

The invention may also be implemented in a computer program for running on a computer system, at least including code portions for performing steps of a method according to the invention when run on a programmable apparatus, such as a computer system or enabling a programmable apparatus to perform functions of a device or system according to the invention. A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A storage system that comprises:
   multiple nodes, each node comprises a solid state drive (SSD) cache and a management module;
   hard disk drives that are coupled to the nodes;
   wherein the management module of each node is arranged to manage a SSD cache map that comprises multiple entries for storing mappings from logical addresses to SSD cache physical addresses and to physical addresses in the hard disk drives; wherein the mappings are related to data units stored in the SSD cache;
   wherein upon a rejoin of a certain node following a shutdown or a failure of the certain node, the certain node is arranged to:
      obtain from at least one other node, current mappings between logical addresses and hard disk drive (HDD) physical addresses, wherein the HDD physical addresses are indicative of addresses in the hard disk drives, and
      perform a validation process of the data units stored in the SSD cache of the certain node in response to relationships between the current mappings and the entries of the SSD cache map.

2. The storage system according to claim 1, wherein the certain node is arranged to invalidate an entry of the SSD cache map that stores a certain logical address if a mapping of that certain logical address to a physical address as reflected by the entry of the SSD cache map differs from a mapping of the certain logical address as reflected by the current mappings.

3. The storage system according to claim 1, wherein the certain node is arranged to reject SSD cache read requests until the validation process is completed.

4. The storage system according to claim 1, wherein the certain node is arranged to maintain a hard disk drives (HDDs) map that maps logical addresses to physical addresses; wherein upon the rejoin, the certain node is arranged to update the HDDs map to reflect the current mapping between logical addresses and physical addresses.

5. The storage system according to claim 1, wherein each node is arranged to store in the SSD cache only data units that were already stored in a hard disk drive.

6. The storage system according to claim 1, wherein the certain node is arranged to invalidate an entry of the SSD cache map that refers to a certain physical address and to a certain logical address if it is suspected that while the certain node was in a failed state, another node wrote to the certain physical address a data unit that was referred by the certain logical address.

7. The storage system according to claim 1, wherein the certain node is arranged to invalidate an entry of the SSD cache map that refers to a certain physical address and to a certain logical address if it is suspected that while the certain node was in a failed state, another node wrote to the certain logical address a data unit regardless of a physical address allocated to the certain logical address.

8. The storage system according to claim 1, wherein the SSD cache map entries store timestamps indicative of a time of writing data units to the SSD cache.

9. The storage system according to claim 8, wherein the certain node is arranged to invalidate, during the validation process and in response to the timestamps, SSD cache map entries that store data units that were written to the SSD cache more than a predetermined period before the validation process.

10. The storage system according to claim 9, wherein a length of the predetermined period is determined in accordance to an expected duration between two successful write operations to a same physical address.

11. The storage system according to claim 9, wherein a length of the predetermined period is determined in accordance to an expected duration between two successful write operations of data units of a same logical address to a same physical address.

12. The storage system according to claim 1, wherein the certain node is arranged to invalidate an entry of the SSD cache map that refers to a certain physical address and to a certain logical address if detecting an invalidation event that occurred while the certain node was in a failed state, and the invalidation event includes writing by another node to the certain physical address a data unit that was referred by the certain logical address.

13. The storage system according to claim 1, wherein the certain node is arranged to invalidate an entry of the SSD cache map that refers to a certain physical address and to a certain logical address if detecting an invalidation event that occurred while the certain node was in a failed state, and the invalidation event included writing a data unit by another node to the certain physical address.

14. The storage system according to claim 13, wherein the certain node is arranged to detect the invalidation event by processing physical address re-allocation metadata indicative of physical address re-allocation events.

15. The storage system according to claim 14, wherein the SSD cache map further stores physical address re-allocation metadata and wherein the certain node is arranged to detect the invalidation event by comparing between physical address re-allocation metadata value and current value of physical address re-allocation metadata.

16. A method, comprising:
maintaining, by each node out of multiple nodes of a storage system, a solid state disk (SSD) cache map that comprises multiple entries for storing mappings from logical addresses to SSD cache physical addresses and to hard disk drives (HDDs) physical addresses; wherein the mappings are related to data units stored in the SSD cache; wherein the multiple nodes are coupled to hard disk drives and each node comprises a solid state drive (SSD) cache and a management module; and
performing a recovery process of a certain node, upon a rejoin of the certain node following a shut-down or a failure of the certain node, wherein the recovery process comprises:
obtaining from at least one other node, current mappings between logical addresses and HDDs physical addresses, wherein the HDDs physical addresses are indicative of addresses in the hard disk drives, and
performing a validation process of the data units stored in the SSD cache of the certain node in response to relationships between the current mappings and the entries of the SSD cache map.

17. The method according to claim 16, comprising invalidating an entry of the SSD cache map that stores a certain logical address if a mapping of that certain logical address to a physical address as reflected by the entry of the SSD cache map differs from a mapping of the certain logical address as reflected by the current mappings.

18. The method according to claim 16, comprising rejecting SSD cache read requests until the validation process is completed.

19. The method according to claim 16, comprising detecting an invalidation event by processing physical address re-allocation metadata indicative of physical address re-allocation events.

20. A non-transitory computer readable medium that stores instructions for:
maintaining, by each node out of multiple nodes of a storage system, a solid state disk (SSD) cache map that comprises multiple entries for storing mappings from logical addresses to SSD cache physical addresses and to hard disk drives (HDDs) physical addresses; wherein the multiple nodes are coupled to hard disk drives and each node comprises a SSD cache and a management module; and
performing a recovery process of a certain node upon a rejoin of a certain node following shut-down or a failure of the certain node, wherein the recovery process comprises (a) obtaining from at least one other node, current mappings between logical addresses and HDDs physical addresses, wherein the HDDs physical addresses are indicative of addresses in the hard disk drives, and (b) performing a validation process of the entries of the SSD cache of the certain node is response to relationships between the current mappings and the entries of the SSD cache map.

* * * * *